United States Patent
Wang et al.

(10) Patent No.: US 11,025,391 B2
(45) Date of Patent: Jun. 1, 2021

(54) PHASE NOISE REFERENCE SIGNAL TRANSMISSION TECHNIQUES

(71) Applicant: ZTE Corporation, Guangdong (CN)

(72) Inventors: Yuxin Wang, Guangdong (CN); Zhaohua Lu, Guangdong (CN); Yu Ngok Li, Guangdong (CN); Yijian Chen, Guangdong (CN); Hao Wu, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/274,139

(22) Filed: Feb. 12, 2019

(65) Prior Publication Data

US 2019/0245666 A1 Aug. 8, 2019

Related U.S. Application Data

(63) Continuation of application No. PCT/CN2017/097394, filed on Aug. 14, 2017.

(30) Foreign Application Priority Data

Aug. 12, 2016 (CN) .......................... 201610668996.2

(51) Int. Cl.
*H04L 5/00* (2006.01)
*H04L 1/00* (2006.01)
(Continued)

(52) U.S. Cl.
CPC .............. *H04L 5/0051* (2013.01); *H04L 1/00* (2013.01); *H04L 5/0053* (2013.01);
(Continued)

(58) Field of Classification Search
CPC ....... H04L 5/0051; H04L 1/00; H04L 5/0053; H04L 27/362; H04L 5/0007; H04L 1/001;
(Continued)

(56) References Cited

U.S. PATENT DOCUMENTS

2011/0170435 A1* 7/2011 Kim ...................... H04L 5/0048
370/252
2012/0033627 A1* 2/2012 Li .......................... H04L 5/0007
370/329
(Continued)

FOREIGN PATENT DOCUMENTS

EP 3446429 A1 2/2019
EP 3471310 A1 4/2019
(Continued)

OTHER PUBLICATIONS

Extended Search Report dated May 25, 2020 for European Application No. 17838844.3, filed on Mar. 12, 2019 (7 pages).

*Primary Examiner* — Tejis Daya
(74) *Attorney, Agent, or Firm* — Perkins Coie LLP

(57) ABSTRACT

Provided is a reference signal transmission method and device. The method includes that a base station transmits indication information to a UE through a downlink control signaling or a higher layer signaling, where the indication information includes one of: information indicating that the UE transmits a reference signal, information indicating whether the reference signal is contained in a physical downlink shared channel or a physical downlink control channel, or information indicating a transmission mode of a downlink reference signal or an uplink reference signal; or the base station pre-defines with the UE a time-frequency resource or a parameter set required by the UE or the base station to transmit the reference signal, where the time-frequency resource or the parameter set includes at least one of: a time domain symbol position, a frequency domain position, a transmission period and a subframe offset, a type of a reference signal sequence or an orthogonal mask. This solves the problem in the existing art of how to properly
(Continued)

place a reference signal on time-frequency resources and trigger a signaling correspondingly.

12 Claims, 3 Drawing Sheets

(51) Int. Cl.
    *H04L 27/36*     (2006.01)
    *H04W 72/04*     (2009.01)
    *H04W 72/08*     (2009.01)

(52) U.S. Cl.
    CPC ......... *H04L 27/362* (2013.01); *H04W 72/042* (2013.01); *H04W 72/082* (2013.01); *H04L 5/0007* (2013.01)

(58) Field of Classification Search
    CPC .............. H04L 1/0026; H04W 72/042; H04W 72/082; H04W 72/044; H04W 72/1221; H04W 72/1226; H04W 72/1263; H04W 72/1278

See application file for complete search history.

(56) References Cited

U.S. PATENT DOCUMENTS

| | | | | |
|---|---|---|---|---|
| 2016/0323087 | A1* | 11/2016 | Kim | H04W 72/1289 |
| 2017/0294926 | A1* | 10/2017 | Islam | H04L 5/0051 |
| 2017/0302352 | A1* | 10/2017 | Islam | H04B 7/0626 |
| 2018/0041321 | A1* | 2/2018 | Guo | H04L 5/0053 |
| 2018/0302905 | A1* | 10/2018 | Fodor | H04L 27/2646 |
| 2019/0082453 | A1* | 3/2019 | Lyu | H04L 5/0053 |
| 2020/0021470 | A1* | 1/2020 | Sun | H04L 27/261 |

FOREIGN PATENT DOCUMENTS

| | | |
|---|---|---|
| EP | 3494661 A1 | 6/2019 |
| WO | 2017184286 A1 | 10/2017 |
| WO | 2018026220 A1 | 2/2018 |

* cited by examiner

Transmit, by a base station, indication information to a UE through a downlink control signaling or a higher layer signaling — S202

Or

Pre-define, by the base station with the UE, a time-frequency resource or a parameter set required by the UE or the base station to transmit the reference signal — S204

FIG. 2

Receive, by a UE, indication information transmitted by a base station through a downlink control signaling or a higher layer signaling ⸺ S302
Or
Pre-define, by the UE with the base station, a time-frequency resource or a parameter set required by the base station to transmit the reference signal ⸺ S304
FIG. 3
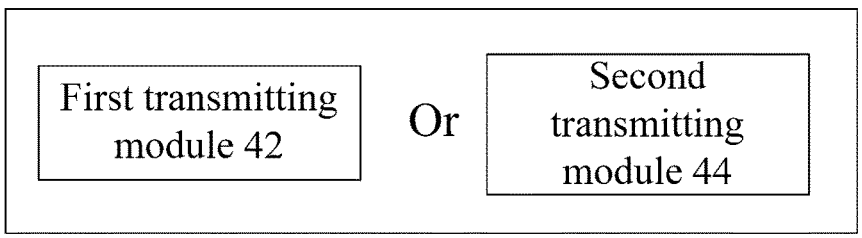
FIG. 4
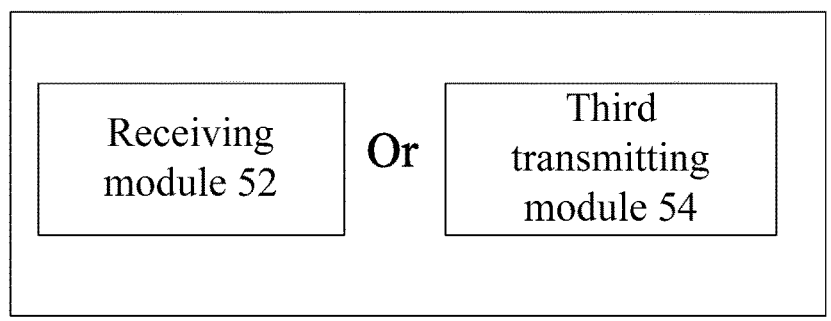
FIG. 5

PHASE NOISE REFERENCE SIGNAL TRANSMISSION TECHNIQUES

CROSS REFERENCE TO RELATED APPLICATIONS

This patent document is a continuation of and claims priority to International Patent Application No. PCT/CN2017/097394, filed on Aug. 14, 2017, which claims the benefit of priority of Chinese Patent Application No. 201610668996.2, filed on Aug. 12, 2016. The entire contents of the before-mentioned patent applications are incorporated by reference as part of the disclosure of this application.

TECHNICAL FIELD

The present disclosure relates to the field of communications and, in particular, to a reference signal (RS) transmission method and device.

BACKGROUND

With the development of communication technologies, the demand for data services is increasing and available low-frequency carriers are in short supply. Therefore, high-frequency (30 to 300 GHz) carrier communication which has not been fully utilized has become an important communication way of achieving high-speed data communication in the future. The high-frequency carrier communication has a large available bandwidth and can provide efficient high-speed data communication. However, a big technical challenge for the high-frequency carrier communication is that high-frequency signals fade significantly in space compared with low-frequency signals. Although this will cause spatial fading losses when the high-frequency signals are used for outdoor communication, the shorter wavelength of the high-frequency signals usually allows using more antennas. Therefore, the communication is implemented based on beams to compensate the spatial fading losses.

However, when the number of antennas increases, each antenna needs a set of radio frequency links, digital beamforming thus brings about increases in costs and power losses. Therefore, current researches tend to hybrid beamforming, that is, hybrid beams formed by radio frequency beams and digital beams.

In high-frequency communication, in addition to channel fading, nonlinear factors of radio frequency devices will reduce system performance of a receiving end. Phase noise is mainly generated by local oscillators and phase-locked loops at receiving and transmitting ends. As a multiplicative noise, the phase noise will expand the spectrum of the signal outputted by the oscillators, thereby reducing system performance. The phase noise has a greater influence on the high-frequency communication. In the existing art, the variation in the phase noise is generally tracked by a pilot signal inserted in a data channel; the receiving end receives the pilot signal and processes and compensates for the influence of the phase noise. However, no effective solution has been proposed on how to properly arrange a reference signal on time-frequency resources and trigger a signaling correspondingly.

SUMMARY

Embodiments of the present disclosure provide a reference signal transmission method and device to at least solve the problem in the existing art of arrangement of a reference signal when a receiving end receives a pilot signal and processes and compensates for the influence of phase noise.

According to an aspect of the present disclosure, a reference signal transmission method is provided. The method includes that a base station transmits indication information to a user equipment (UE) through a downlink control signaling or a higher layer signaling, where the indication information includes one of: information indicating that the UE transmits a reference signal, information indicating whether the reference signal is contained in a physical downlink shared channel or a physical downlink control channel, or information indicating a transmission mode of a downlink reference signal or an uplink reference signal; or the base station pre-defines with the UE a time-frequency resource or a parameter set required by the UE or the base station to transmit the reference signal, where the time-frequency resource or the parameter set includes at least one of: a time domain symbol position, a frequency domain position, a transmission period and a subframe offset, a type of a reference signal sequence or an orthogonal mask.

According to another aspect of the present disclosure, a reference signal transmission method is provided. The method includes that a base station transmits a reference signal to a user equipment under a first condition, where the first condition includes one of: a downlink data modulation scheme is 16 QAM or 64 QAM or 256 QAM, the downlink data modulation scheme is a higher order modulation scheme than 16 QAM or 64 QAM, an index of a modulation and coding scheme of downlink data is greater than or equal to A, the base station receives information from the user equipment for requesting the base station to transmit the reference signal, or an index of a channel quality indication (CQI) reported by the user equipment is greater than or equal to B; where A is 5 or 10 or 11 or 17, or an integer between 5 and 30 except 5, 10, 11 and 17; and B is 4 or 7 or 10, or an integer between 4 and 30 except 4, 7 and 10. According to another aspect of the present disclosure, a reference signal transmission method is provided. The method includes that a user equipment transmits a reference signal to a base station under a second condition, where the second condition includes one of: an uplink data modulation scheme is 16 QAM or 64 QAM or 256 QAM, the uplink data modulation scheme is a higher order modulation scheme than 16 QAM or 64 QAM, or an index of a modulation and coding scheme of uplink data is greater than or equal to C, where C is 11 or 21, or an integer between 4 and 30 except 11 and 21.

According to yet another aspect of the present disclosure, a reference signal transmission device, which is applied to a base station, is provided. The device includes a first transmitting module or a second transmitting module. The first transmitting module is configured to transmit indication information to a user equipment (UE) through a downlink control signaling or a higher layer signaling, where the indication information includes one of: information indicating that the UE transmits a reference signal, information indicating whether the reference signal is contained in a physical downlink shared channel or a physical downlink control channel, or information indicating a transmission mode of a downlink reference signal or an uplink reference signal. The second transmitting module is configured to pre-define, with the UE, a time-frequency resource or a parameter set required by the UE or the base station to transmit the reference signal, where the time-frequency resource or the parameter set includes at least one of: a time domain symbol position, a frequency domain position, a transmission period and a subframe offset, a type of a reference signal sequence or an orthogonal mask.

According to yet another aspect of the present disclosure, a reference signal transmission device, which is applied to a UE, is provided. The device includes a receiving module or a third transmitting module. The receiving module is configured to receive indication information transmitted by a base station through a downlink control signaling or a higher layer signaling, where the indication information includes one of: information indicating that the UE transmits a reference signal, information indicating whether the reference signal is contained in a physical downlink shared channel or a physical downlink control channel, or information indicating a transmission mode of a downlink reference signal or an uplink reference signal. The third transmitting module is configured to pre-define, with the base station, a time-frequency resource or a parameter set required by the base station to transmit the reference signal, where the time-frequency resource or the parameter set includes at least one of: a time domain symbol position, a frequency domain position, a transmission period and a subframe offset, a type of a reference signal sequence or an orthogonal mask.

According to yet another aspect of the present disclosure, a reference signal transmission device, which is applied to a base station, is provided. The device includes a fourth transmitting module, which is configured to transmit a reference signal to a user equipment under a first condition, where the first condition includes one of: a downlink data modulation scheme is 16 QAM or 64 QAM or 256 QAM, the downlink data modulation scheme is a higher order modulation scheme than 16 QAM or 64 QAM, an index of a modulation and coding scheme of downlink data is greater than or equal to A, the base station receives information from the user equipment for requesting the base station to transmit the reference signal, or an index of a channel quality indication (CQI) reported by the user equipment is greater than or equal to B; where A is 5 or 10 or 11 or 17, or an integer between 5 and 30 except 5, 10, 11 and 17; and B is 4 or 7 or 10, or an integer between 4 and 30 except 4, 7 and 10.

According to yet another aspect of the present disclosure, a reference signal transmission device, applied to a user equipment, is provided. The device includes a fifth transmitting module, which is configured to transmit a reference signal to a base station under a second condition, where the second condition includes one of: an uplink data modulation scheme is 16 QAM or 64 QAM or 256 QAM, the uplink data modulation scheme is a higher order modulation scheme than 16 QAM or 64 QAM, or an index of a modulation and coding scheme of uplink data is greater than or equal to C, where C is 11 or 21, or an integer between 4 and 30 except 11 and 21. According to another embodiment of the present disclosure, a storage medium is further provided. The storage medium is configured to store program codes for executing the steps described below.

A time-frequency resource or a parameter set for transmitting a reference signal is configured for a user equipment (UE), and the configured time-frequency resource or parameter set is transmitted to the UE; or the base station pre-defines with the UE a time-frequency resource or a parameter set required by the UE to transmit phase noise. The time-frequency resource or the parameter set includes at least one of: a time domain symbol position, a frequency domain position, a transmission period and a subframe offset, a type of a reference signal sequence or an orthogonal mask.

The embodiments of the present disclosure enable the UE to obtain the required time-frequency resource or parameter set to properly arrange the reference signal on time-frequency resources, thereby solving the problem in the existing art of arrangement of the reference signal when the receiving end receives the pilot signal and processes and compensates for the influence of the phase noise.

BRIEF DESCRIPTION OF DRAWINGS

The accompanying drawings described herein are used to provide a further understanding of the present disclosure, and form a part of the present application. The exemplary embodiments and descriptions thereof in the present disclosure are used to illustrate the present disclosure and not to limit the present disclosure in any improper way. In the accompanying drawings:

FIG. 2 is a flowchart 1 of a reference signal transmission method according to an embodiment of the present disclosure;

FIG. 3 is a flowchart 2 of a reference signal transmission method according to an embodiment of the present disclosure;

FIG. 4 is a block diagram 1 of a reference signal transmission device according to an embodiment of the present disclosure; and FIG. 5 is a block diagram 2 of a reference signal transmission device according to an embodiment of the present disclosure.

DETAILED DESCRIPTION

Figure 1:
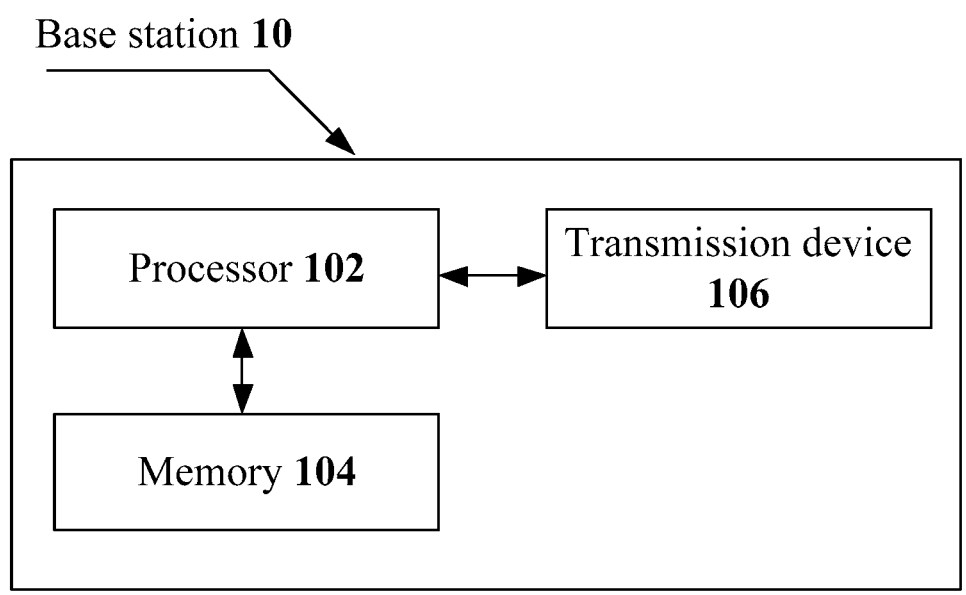
FIG. 1 is a block diagram of hardware of a base station implementing a reference signal transmission method according to an embodiment of the present disclosure.

The present disclosure will be described in detail with reference to the accompanying drawings in conjunction with the embodiments. It is to be noted that if not in collision, the embodiments and features therein in the present application may be combined with each other.

It is to be noted that the terms "first", "second" and the like in the description, claims and drawings of the present disclosure are used to distinguish between similar objects and are not necessarily used to describe a particular order or sequence.

Embodiment 1

A method embodiment provided by an embodiment 1 of the present application may be executed in a mobile terminal, a base station or another similar computing device. In an example in which the method is executed in a base station, FIG. 1 is a block diagram of hardware of a base station implementing a reference signal transmission method according to an embodiment of the present disclosure. As shown in FIG. 1, a base station 10 may include one or more (only one is shown in FIG. 1) processors 102 (the processors 102 may include, but are not limited to, a processing device including a microprocessor such as an MCU or a programmable logic device such as an FPGA), a memory 104 for storing data, and a transmission device 106 for implementing a communication function. It will be understood by those skilled in the art that the structure shown in FIG. 1 is merely illustrative, and not intended to limit the structure of the electronic device described above. For example, the base station 10 may further include more or less components than the components shown in FIG. 1, or has a configuration different from the configuration shown in FIG. 1.

The memory 104 may be configured to store the software program and modules of an application software, such as program instructions/modules corresponding to the reference signal transmission method in the embodiments of the present disclosure. The processors 102 execute the software program and modules stored in the memory 104 to perform functional applications and data processing, that is, to implement the method described above. The memory 104 may include a high-speed random access memory, and may further include a nonvolatile memory, such as one or more magnetic storage devices, flash memories or other nonvolatile solid-state memories. In some examples, the memory 104 may further include memories that are remotely disposed with respect to the processors 102. These remote memories may be connected to the mobile terminal 10 via a network. Examples of such a network include, but are not limited to, the Internet, intranet, local area network, mobile communication network, and combinations thereof.

The transmission device 106 is configured to receive or transmit data via a network. Specific examples of such a network may include a wireless network provided by a communication provider of the base station 10. In one example, the transmission device 106 includes a network interface controller (NIC), which may be connected to other network devices via the base station and thus is capable of communicating with the Internet. In one example, the transmission 106 may be a radio frequency (RF) module, which is configured to communicate with the Internet in a wireless way.

This embodiment provides a reference signal transmission method executed in the base station. FIG. 2 is a flowchart 1 of a reference signal transmission method according to an embodiment of the present disclosure. As shown in FIG. 2, the method includes the steps described below. In step S202, a base station transmits indication information to a UE through a downlink control signaling or a higher layer signaling. The indication information includes one of: information indicating that the UE transmits a reference signal, information indicating whether the reference signal is contained in a physical downlink shared channel or a physical downlink control channel, or information indicating a transmission mode of a downlink reference signal or an uplink reference signal.

Alternatively, in step S204, the base station pre-defines with the UE a time-frequency resource or a parameter set required by the UE or the base station to transmit the reference signal. The time-frequency resource or the parameter set includes at least one of: a time domain symbol position, a frequency domain position, a transmission period and a subframe offset, a type of a reference signal sequence or an orthogonal mask.

It is to be noted that the step S202 and the step S204 are two parallel steps in the method. The step S202 or the step S204 enables the UE to obtain the required time-frequency resource or parameter set, to properly arrange the reference signal on the time-frequency resources and to transmit the reference signal according to the indication information, thereby solving the problem in the existing art of arrangement of a reference signal when a receiving end receives a pilot signal and processes and compensates for the influence of phase noise.

In an optional implementation of this embodiment, the reference signal in this embodiment includes one of: a downlink/uplink demodulation reference signal, a downlink/uplink phase noise reference signal or a reference signal for downlink/uplink phase noise compensation or cancellation.

In another optional implementation of this embodiment, the transmission mode for transmitting the downlink reference signal or the uplink reference signal includes one of: precoding, non-precoding, basing on antenna ports having the same number as downlink demodulation reference signals/channel state information reference signals, basing on antenna ports having the same number as uplink demodulation reference signals/measurement reference signals, basing on a layer or basing on an antenna port.

It is to be noted that the time domain symbol position includes at least one of: all or part of time domain symbol positions for transmitting downlink data or the physical downlink shared channel; all or part of time domain symbol positions for transmitting the downlink control signaling or the physical downlink control channel; or all or part of time domain symbol positions for transmitting uplink data or a physical uplink shared channel. The part of the time domain symbol positions is predefined between the base station and the UE, where the part of the time domain symbol positions is relevant to a system transmission bandwidth or a carrier frequency or a subcarrier spacing or a downlink modulation scheme or an uplink modulation scheme; or the part of the time domain symbol positions is configured by the base station according to the system transmission bandwidth or the carrier frequency or the subcarrier spacing or the downlink modulation scheme or the uplink modulation scheme.

Optionally, the frequency domain position includes: one or more subcarrier positions in every M physical resource blocks. M is an integer and M is predefined between the base station and the UE, or M is relevant to a system transmission bandwidth or a carrier frequency or a subcarrier spacing or a downlink modulation scheme or an uplink modulation scheme, or M is configured according to the system transmission bandwidth or the carrier frequency or the subcarrier spacing or the downlink modulation scheme or the uplink modulation scheme.

Optionally, the type of the reference signal sequence includes at least one of: a pseudo random sequence or a Zadoff-Chu sequence.

It is to be noted that the orthogonal mask includes multiplexing the reference signals of different antenna ports using at least one of: code division, combination of code division and time division, combination of code division and frequency division, or combination of code division, time division and frequency division. The code division refers to multiplexing with different orthogonal masks.

Optionally, when the indication information is transmitted through the downlink control signaling, the base station notifies, through the downlink control signaling, that the UE transmits the reference signal in at least one of the following modes.

(1) The base station triggers, through the downlink control signaling of 1 bit, transmission of the reference signal by the UE.

(2) In a case where the base station configures, through the higher layer signaling, N resources or modes or patterns for transmitting the reference signal for the UE and indicates, through the downlink control signaling of k bits, that the UE needs to transmit the reference signal, the UE selects one resource or mode or pattern from the N resources or modes or patterns to transmit the reference signal.

(3) In a case where the base station pre-defines with the UE N resources or modes or patterns for transmitting the reference signal and indicates, through the downlink control signaling of k bits, that the UE needs to transmit the reference signal, the UE selects one resource or mode or pattern from the N resources or modes or patterns to transmit the reference signal.

Optionally, the base station indicates to the UE through the downlink control signaling: whether the reference signal is contained in the physical downlink shared channel or the physical downlink control channel. Alternatively, the base station indicates to the UE through the downlink control signaling: whether the reference signal is contained in the physical downlink shared channel or the physical downlink control channel; and a reference signal configuration mode or pattern.

Embodiment 2

This embodiment will be described in detail from the side of UE. This embodiment provides a reference signal transmission method. FIG. 3 is a flowchart 2 of a reference signal transmission method according to an embodiment of the present disclosure. As shown in 3, the method includes the steps described below.

In step S302, a UE receives indication information transmitted by a base station through a downlink control signaling or a higher layer signaling. The indication information includes one of: information indicating that the UE transmits a reference signal, information indicating whether the reference signal is contained in a physical downlink shared channel or a physical downlink control channel, or information indicating a transmission mode of a downlink reference signal or an uplink reference signal.

Alternatively, in step S304, the UE pre-defines with the base station a time-frequency resource or a parameter set required by the base station to transmit the reference signal. The time-frequency resource or the parameter set includes at least one of: a time domain symbol position, a frequency domain position, a transmission period and a subframe offset, a type of a reference signal sequence or an orthogonal mask.

The step S302 and the step S304 respectively correspond to the step S202 and the step S204 described above. That is, the time-frequency resource or a parameter set obtained by the UE may be configured by the base station, or may be pre-defined by the base station and the UE. In other words, the step S302 and the step S304 are also two parallel steps.

The reference signal includes one of: a second downlink/uplink demodulation reference signal, a downlink/uplink phase noise reference signal or a reference signal for downlink/uplink phase noise compensation or cancellation.

In an optional implementation of this embodiment, the transmission mode for transmitting the downlink reference signal or the uplink reference signal involved in this embodiment includes one of: precoding, non-precoding, basing on antenna ports having the same number as downlink demodulation reference signals/channel state information reference signals, basing on antenna ports having the same number as uplink demodulation reference signals/measurement reference signals, basing on a layer or basing on an antenna port.

In another optional implementation of this embodiment, the time domain symbol position involved in this embodiment includes at least one of: all or part of time domain symbol positions for transmitting downlink data or the physical downlink shared channel; all or part of time domain symbol positions for transmitting the downlink control signaling or the physical downlink control channel; or all or part of time domain symbol positions for transmitting uplink data or an uplink shared channel.

The part of the time domain symbol positions is pre-defined between the base station and the UE, where the part of the time domain symbol positions is relevant to a system transmission bandwidth or a carrier frequency or a subcarrier spacing or a downlink modulation scheme or an uplink modulation scheme; or the part of the time domain symbol positions is configured by the base station according to the system transmission bandwidth or the carrier frequency or the subcarrier spacing or the downlink modulation scheme or the uplink modulation scheme.

In another optional implementation of this embodiment, the frequency domain position involved in this embodiment includes: one or more subcarrier positions in every M physical resource blocks. M is an integer and M is pre-defined between the base station and the UE, or M is relevant to a system transmission bandwidth or a carrier frequency or a subcarrier spacing or a downlink modulation scheme or an uplink modulation scheme, or M is configured according to the system transmission bandwidth or the carrier frequency or the subcarrier spacing or the downlink modulation scheme or the uplink modulation scheme.

In another optional implementation of this embodiment, the type of the reference signal sequence involved in this embodiment includes at least one of: a pseudo random sequence or a Zadoff-Chu sequence.

Optionally, the orthogonal mask includes multiplexing the reference signals of different antenna ports using at least one of: code division, combination of code division and time division, combination of code division and frequency division, or combination of code division, time division and frequency division. The code division refers to multiplexing with different orthogonal masks.

Optionally, when the indication information is transmitted through the downlink control signaling, the UE receives the downlink control signaling transmitted by the base station to notify the transmission of the reference signal in at least one of the following modes: the UE receives the downlink control signaling of 1 bit transmitted by the base station, the downlink control signaling of 1 bit is used for triggering the UE to receive N resources or modes or patterns for transmitting the reference signal configured by the base station for the UE through the higher layer signaling and receive the downlink control signaling of k bits, the downlink control signaling of k bits being used for indicating that the UE selects one resource or mode or pattern from the N resources or modes or patterns for transmission when the UE needs transmission; the UE pre-defines with the base station N resources or modes or patterns for transmitting the reference signal and receives the downlink control signaling of k bits transmitted by the base station, the downlink control signaling of k bits being used for indicating that the UE selects one resource or mode or pattern from the N resources or modes or patterns for transmission when the UE needs transmission.

Embodiment 3

This embodiment provides a reference signal transmission method. The method includes that a base station transmits a reference signal to a user equipment under a first condition.

The first condition includes one of: a downlink data modulation scheme is 16 QAM or 64 QAM or 256 QAM, the downlink data modulation scheme is a higher order modulation scheme than 16 QAM or 64 QAM, an index of a modulation and coding scheme of downlink data is greater than or equal to A, the base station receives information from the user equipment for requesting the base station to transmit the reference signal, or an index of a CQI reported by the user equipment is greater than or equal to B.

A is 5 or 10 or 11 or 17, or an integer between 5 and 30 except 5, 10, 11 and 17; and B is 4 or 7 or 10, or an integer between 4 and 30 except 4, 7 and 10.

Optionally, the reference signal is a second downlink/uplink demodulation reference signal or a downlink/uplink phase noise reference signal or a reference signal for downlink/uplink phase noise compensation or cancellation.

Optionally, a transmission mode for transmitting the reference signal includes one of: precoding, non-precoding, basing on antenna ports having the same number as downlink demodulation reference signals/channel state information reference signals, basing on antenna ports having the same number as uplink demodulation reference signals/measurement reference signals, basing on a layer or basing on an antenna port.

Embodiment 4

This embodiment provides a reference signal transmission method. The method includes that a UE transmits a reference signal to a base station under a second condition.

The second condition includes one of: an uplink data modulation scheme is 16 QAM or 64 QAM or 256 QAM, the uplink data modulation scheme is a higher order modulation scheme than 16 QAM or 64 QAM, or an index of a modulation and coding scheme of uplink data is greater than or equal to C. C is 11 or 21, or an integer between 4 and 30 except 11 and 21.

Optionally, the reference signal is a second downlink/uplink demodulation reference signal or a downlink/uplink phase noise reference signal or a reference signal for downlink/uplink phase noise compensation or cancellation.

Optionally, a transmission mode for transmitting the reference signal includes one of: precoding, non-precoding, basing on antenna ports having the same number as downlink demodulation reference signals/channel state information reference signals, basing on antenna ports having the same number as uplink demodulation reference signals/measurement reference signals, basing on a layer or basing on an antenna port.

From the description of the embodiments described above, it will be apparent to those skilled in the art that the method of any embodiment described above may be implemented by software in combination with a necessary general-purpose hardware platform, or may of course be implemented by hardware; but in many cases, the former is a preferred implementation mode. Based on this understanding, the solutions provided by the present disclosure substantially, or the part contributing to the existing art, may be embodied in the form of a software product. The computer software product is stored in a storage medium (such as a ROM/RAM, a magnetic disk or an optical disk) and includes several instructions for enabling a terminal device (which may be a mobile phone, a computer, a server, a network device, or the like) to execute the method according to each embodiment of the present disclosure.

Embodiment 3

This embodiment further provides a reference signal transmission device. The device is configured to implement the above-mentioned embodiments and preferred implementations. What has been described will not be repeated. As used below, the term "module" may be software, hardware or a combination thereof capable of implementing predetermined functions. The device in the embodiments described below is preferably implemented by software, but implementation by hardware or by a combination of software and hardware is also possible and conceived.

FIG. 4 is a block diagram 1 of a reference signal transmission device according to an embodiment of the present disclosure. The device is applied to a base station and includes a first transmitting module 42, which is configured to transmit indication information to a UE through a downlink control signaling or a higher layer signaling. The indication information includes one of: information indicating that the UE transmits a reference signal, information indicating whether the reference signal is contained in a physical downlink shared channel or a physical downlink control channel, or information indicating a transmission mode of a downlink reference signal or an uplink reference signal.

Alternatively, the device includes a second transmitting module 44, which is configured to pre-define, with the UE, a time-frequency resource or a parameter set required by the UE or the base station to transmit the reference signal. The time-frequency resource or the parameter set includes at least one of: a time domain symbol position, a frequency domain position, a transmission period and a subframe offset, a type of a reference signal sequence or an orthogonal mask.

It is to be noted that this embodiment is a device embodiment corresponding to the method steps in the embodiment 1. The time domain symbol position, the frequency domain position, the transmission period and the subframe offset, the type of the reference signal sequence and the orthogonal mask have been described in the embodiment 1 and will not be repeated here.

In an optional implementation of this embodiment, the reference signal includes one of: a downlink/uplink demodulation reference signal, a downlink/uplink phase noise reference signal or a reference signal for downlink/uplink phase noise compensation or cancellation.

Optionally, the first transmitting module or the second transmitting module is configured to transmit the downlink reference signal or the uplink reference signal in a transmission mode including one of: precoding, non-precoding, basing on antenna ports having the same number as downlink demodulation reference signals/channel state information reference signals, basing on antenna ports having the same number as uplink demodulation reference signals/measurement reference signals, basing on a layer or basing on an antenna port.

In an optional implementation of this embodiment, the time domain symbol position includes at least one of: all or part of time domain symbol positions for transmitting downlink data or the physical downlink shared channel; all or part of time domain symbol positions for transmitting the downlink control signaling or the physical downlink control channel; or all or part of time domain symbol positions for transmitting uplink data or a physical uplink shared channel. The part of the time domain symbol positions is predefined between the base station and the UE, where the part of the time domain symbol positions is relevant to a system transmission bandwidth or a carrier frequency or a subcarrier spacing or a downlink modulation scheme or an uplink modulation scheme; or the part of the time domain symbol positions is configured by the base station according to the system transmission bandwidth or the carrier frequency or the subcarrier spacing or the downlink modulation scheme or the uplink modulation scheme.

Optionally, the frequency domain position includes: one or more subcarrier positions in every M physical resource blocks. M is an integer and M is predefined between the base station and the UE, or M is relevant to a system transmission bandwidth or a carrier frequency or a subcarrier spacing or a downlink modulation scheme or an uplink modulation scheme, or M is configured according to the system transmission bandwidth or the carrier frequency or the subcarrier spacing or the downlink modulation scheme or the uplink modulation scheme.

In an optional implementation of this embodiment, the type of the reference signal sequence includes at least one of: a pseudo random sequence or a Zadoff-Chu sequence.

In an optional implementation of this embodiment, the orthogonal mask includes multiplexing the reference signals of different antenna ports using at least one of: code division, combination of code division and time division, combination of code division, frequency division, or combination of code division and time division and frequency division. The code division refers to multiplexing with different orthogonal masks.

In an optional implementation of this embodiment, when the indication information is transmitted through the downlink control signaling, the first transmitting module notifies, through the downlink control signaling, that the UE transmits the reference signal in at least one of the following modes.

(1) The base station triggers, through the downlink control signaling of 1 bit, transmission of the reference signal by the UE.

(2) In a case where the base station configures, through the higher layer signaling, N resources or modes or patterns for transmitting the reference signal for the UE and indicates, through the downlink control signaling of k bits, that the UE needs to transmit the reference signal, the UE selects one resource or mode or pattern from the N resources or modes or patterns to transmit the reference signal.

(3) In a case where the base station pre-defines with the UE N resources or modes or patterns for transmitting the reference signal and indicates, through the downlink control signaling of k bits, that the UE needs to transmit the reference signal, the UE selects one resource or mode or pattern from the N resources or modes or patterns to transmit the reference signal.

Optionally, the first transmitting module is further configured to indicate to the UE through the downlink control signaling: whether the reference signal is contained in the physical downlink shared channel or the physical downlink control channel. Alternatively, the first transmitting module is further configured to indicate to the UE through the downlink control signaling: whether the reference signal is contained in the physical downlink shared channel or the physical downlink control channel; and a reference signal configuration mode or pattern.

Embodiment 4

FIG. 5 is a block diagram 2 of a reference signal transmission device according to an embodiment of the present disclosure. The device is applicable to a UE. As shown in FIG. 5, the device includes a receiving module 52, which is configured to receive indication information transmitted by a base station through a downlink control signaling or a higher layer signaling. The indication information includes one of: information indicating that the UE transmits a reference signal, information indicating whether the reference signal is contained in a physical downlink shared channel or a physical downlink control channel, or information indicating a transmission mode of a downlink reference signal or an uplink reference signal.

Alternatively, the device includes a third transmitting module 54, which is configured to pre-define, with the base station, a time-frequency resource or a parameter set required by the base station to transmit the reference signal. The time-frequency resource or the parameter set includes at least one of: a time domain symbol position, a frequency domain position, a transmission period and a subframe offset, a type of a reference signal sequence or an orthogonal mask.

It is to be noted that this embodiment is a device embodiment corresponding to the method steps in the embodiment 2. The time domain symbol position, the frequency domain position, the transmission period and the subframe offset, the type of the reference signal sequence and the orthogonal mask have been described in the embodiment 2 and will not be repeated here.

In an optional implementation of this embodiment, the reference signal includes one of: a second downlink/uplink demodulation reference signal, a downlink/uplink phase noise reference signal or a reference signal for downlink/uplink phase noise compensation or cancellation.

Optionally, the transmission mode for transmitting the downlink reference signal or the uplink reference signal includes one of: precoding, non-precoding, basing on antenna ports having the same number as downlink demodulation reference signals/channel state information reference signals, basing on antenna ports having the same number as uplink demodulation reference signals/measurement reference signals, basing on a layer or basing on an antenna port.

In an optional implementation of this embodiment, the time domain symbol position includes at least one of: all or part of time domain symbol positions for transmitting downlink data or the physical downlink shared channel; all or part of time domain symbol positions for transmitting the downlink control signaling or the physical downlink control channel; or all or part of time domain symbol positions for transmitting uplink data or an uplink shared channel. The part of the time domain symbol positions is predefined between the base station and the UE, where the part of the time domain symbol positions is relevant to a system transmission bandwidth or a carrier frequency or a subcarrier spacing or a downlink modulation scheme or an uplink modulation scheme; or the part of the time domain symbol positions is configured by the base station according to the system transmission bandwidth or the carrier frequency or the subcarrier spacing or the downlink modulation scheme or the uplink modulation scheme.

In an optional implementation of this embodiment, the frequency domain position includes: one or more subcarrier positions in every M physical resource blocks. M is an integer and M is predefined between the base station and the UE, or M is relevant to a system transmission bandwidth or a carrier frequency or a subcarrier spacing or a downlink modulation scheme or an uplink modulation scheme, or M is configured according to the system transmission bandwidth or the carrier frequency or the subcarrier spacing or the downlink modulation scheme or the uplink modulation scheme.

In an optional implementation of this embodiment, the type of the reference signal sequence includes at least one of: a pseudo random sequence or a Zadoff-Chu sequence.

In an optional implementation of this embodiment, the orthogonal mask includes multiplexing the reference signals of different antenna ports using at least one of: code division, combination of code division and time division, combination of code division and frequency division, or combination of code division, time division and frequency division. The code division refers to multiplexing with different orthogonal masks.

In an optional implementation of this embodiment, when the indication information is transmitted through the downlink control signaling, the receiving module is further configured to receive the downlink control signaling of 1 bit transmitted by the base station. The downlink control signaling of 1 bit is used for triggering the UE to receive N resources or modes or patterns for transmitting the reference signal configured by the base station for the UE through the higher layer signaling and receive the downlink control signaling of k bits, the downlink control signaling being used for indicating that the UE selects one resource or mode or pattern from the N resources or modes or patterns for transmission when the UE needs transmission; alternatively, the receiving module is further configured to receive the downlink control signaling of k bits transmitted by the base station after the UE pre-defines with the base station N resources or modes or patterns for transmitting the reference signal, the downlink control signaling being used for indicating that the UE selects one resource or mode or pattern from the N resources or modes or patterns for transmission when the UE needs transmission.

The various modules described above may be implemented by software or hardware.

Implementation by hardware may, but may not necessarily, be performed by the following method: The various modules described above are located in a same processor or their respective processors.

Embodiment 5

On the basis of the embodiment 3 and the embodiment 4 described above, this embodiment provides a reference signal transmission system. The system includes the reference signal transmission device in the embodiment 2 and the reference signal transmission device in the embodiment 3.

Embodiment 6

This embodiment provides a reference signal transmission device. The device is applied to a base station and includes a fourth transmitting module, which is configured to transmit a reference signal to a user equipment under a first condition.

The first condition includes one of: a downlink data modulation scheme is 16 QAM or 64 QAM or 256 QAM, the downlink data modulation scheme is a higher order modulation scheme than 16 QAM or 64 QAM, an index of a modulation and coding scheme of downlink data is greater than or equal to A, the base station receives information from the user equipment for requesting the base station to transmit the reference signal, or an index of a CQI reported by the user equipment is greater than or equal to B.

A is 5 or 10 or 11 or 17, or an integer between 5 and 30 except 5, 10, 11 and 17; and B is 4 or 7 or 10, or an integer between 4 and 30 except 4, 7 and 10.

In an optional implementation of this embodiment, the reference signal is a second downlink/uplink demodulation reference signal or a downlink/uplink phase noise reference signal or a reference signal for downlink/uplink phase noise compensation or cancellation. In an optional implementation of this embodiment, a transmission mode for transmitting the reference signal includes one of: precoding, non-precoding, basing on antenna ports having the same number as downlink demodulation reference signals/channel state information reference signals, basing on antenna ports having the same number as uplink demodulation reference signals/measurement reference signals, basing on a layer or basing on an antenna port.

Embodiment 7

This embodiment provides a reference signal transmission device. The device is applied to a UE and includes a fifth transmitting module, which is configured to transmit a reference signal to a base station under a second condition.

The second condition includes one of: an uplink data modulation scheme is 16 QAM or 64 QAM or 256 QAM, the uplink data modulation scheme is a higher order modulation scheme than 16 QAM or 64 QAM, or an index of a modulation and coding scheme of uplink data is greater than or equal to C. C is 11 or 21, or an integer between 4 and 30 except 11 and 21.

Optionally, the reference signal is a second downlink/uplink demodulation reference signal or a downlink/uplink phase noise reference signal or a reference signal for downlink/uplink phase noise compensation or cancellation.

Optionally, a transmission mode for transmitting the reference signal includes one of: precoding, non-precoding, basing on antenna ports having the same number as downlink demodulation reference signals/channel state information reference signals, basing on antenna ports having the same number as uplink demodulation reference signals/measurement reference signals, basing on a layer or basing on an antenna port.

Embodiment 8

A base station configures a time-frequency resource required for transmitting a reference signal for a user equipment and notifies the user equipment of the configured time-frequency resource. Alternatively, the base station pre-defines with the user equipment a time-frequency resource required by the user equipment to transmit phase noise. The time-frequency resource includes: a time domain symbol position or a frequency domain position.

The time domain symbol position includes: all or part of time domain symbol positions for transmitting downlink data or a downlink shared channel, or all or part of time domain symbol positions for transmitting uplink data or an uplink shared channel. The part of the time domain symbol positions is predefined between the base station and the UE, or the part of the time domain symbol positions is relevant to a system transmission bandwidth or a subcarrier spacing or a downlink modulation scheme or an uplink modulation scheme, or the part of the time domain symbol positions is configured according to the system transmission bandwidth or the subcarrier spacing or the downlink modulation scheme or the uplink modulation scheme.

The frequency domain position includes: one or more subcarrier positions in every M physical resource blocks. M is an integer and M is predefined between the base station and the UE, or M is relevant to a system transmission bandwidth or a subcarrier spacing or a downlink modulation scheme or an uplink modulation scheme, or M is configured according to the system transmission bandwidth or the subcarrier spacing or the downlink modulation scheme or the uplink modulation scheme.

Embodiment 9

A base station configures a parameter set required for transmitting a reference signal for a user equipment and notifies the user equipment of the configured parameter set. Alternatively, the base station pre-defines with the user equipment a parameter set required by the user equipment to transmit phase noise.

The parameter set includes: a transmission period and a subframe offset, a type of a reference signal sequence, or an orthogonal mask.

The transmission period and the subframe offset are configured by the base station for the user equipment through a higher layer signaling.

The type of the reference signal sequence includes a pseudo random sequence or a Zadoff-Chu sequence.

The orthogonal mask includes multiplexing the reference signals of different antenna ports using: code division, combination of code division and time division, combination of code division and frequency division, or combination of code division, time division and frequency division. The code division refers to multiplexing with different orthogonal masks.

Embodiment 10

A base station notifies, through a downlink control signaling, that a user equipment transmits a reference signal in the following modes.

The base station triggers, through the downlink control signaling of 1 bit, transmission of the reference signal by the user equipment.

Alternatively, the base station configures, through a higher layer signaling, N resources or modes or patterns for transmitting the reference signal for the user equipment and indicates, through the downlink control signaling of k bits, whether the user equipment needs to transmit the reference signal and which one of the N resources or modes or patterns is used by the user equipment to transmit the reference signal.

Alternatively, the base station pre-defines with the user equipment N resources or modes or patterns for transmitting the reference signal and indicates, through the downlink control signaling of k bits, whether the user equipment needs to transmit the reference signal and which one of the N resources or modes or patterns is used by the user equipment to transmit the reference signal.

The base station indicates to the user equipment whether the reference signal is contained in a physical downlink shared channel through the downlink control signaling, or indicates to the user equipment whether the reference signal is contained in the physical downlink shared channel and a reference signal configuration mode or pattern through the downlink control signaling.

In step S1, the base station configures a time-frequency resource or a parameter set required for transmitting the reference signal for the UE and transmits the configured time-frequency resource or parameter set to the UE. Alternatively, in step S2, the base station with the UE pre-defines a time-frequency resource or a parameter set required by the UE to transmit phase noise. The time-frequency resource or the parameter set includes at least one of: a time domain symbol position, a frequency domain position, a transmission period and a subframe offset, a type of a reference signal sequence or an orthogonal mask.

Embodiment 11

A base station indicates a transmission mode of a downlink reference signal or an uplink reference signal to a user equipment through a downlink control signaling. The transmission mode includes one of: precoding, non-precoding, basing on antenna ports having the same number as downlink demodulation reference signals/channel state information reference signals, basing on antenna ports having the same number as uplink demodulation reference signals/measurement reference signals, basing on a layer or basing on an antenna port.

Embodiment 12

A base station transmits a reference signal to a user equipment under a specific condition 1. The specific condition 1 includes one of: a downlink data modulation scheme is 16 QAM or 64 QAM or 256 QAM, the downlink data modulation scheme is a higher order modulation scheme than 16 QAM or 64 QAM, an index of a modulation and coding scheme of downlink data is greater than or equal to 5 or 10 or 11 or 17, the base station receives information from the user equipment for requesting the base station to transmit the reference signal, or an index of a CQI reported by the user equipment is greater than or equal to 4 or 7 or 10.

Alternatively, the user equipment transmits a reference signal to the base station under a specific condition 2. The specific condition 2 includes one of: an uplink data modulation scheme is 16 QAM or 64 QAM or 256 QAM, the uplink data modulation scheme is a higher order modulation scheme than 16 QAM or 64 QAM, or an index of a modulation and coding scheme of uplink data is greater than or equal to 11 or 21.

The reference signal is a second downlink/uplink demodulation reference signal or a downlink/uplink phase noise reference signal or a reference signal for downlink/uplink phase noise compensation or cancellation.

An embodiment of the present disclosure further provides a storage medium. Optionally, in this embodiment, the storage medium described above may be configured to store program codes for executing the steps described below.

In step S1, a UE receives a time-frequency resource or a parameter set required by the UE to transmit a reference signal configured by a base station and transmits the reference signal on a basis of the configured time-frequency resource or parameter set. Alternatively, in step S2, the UE pre-defines with the base station the time-frequency resource or the parameter set required by the UE to transmit the reference signal and transmits the reference signal on a basis of the pre-defined time-frequency resource or parameter set.

The time-frequency resource or the parameter set includes at least one of: a time domain symbol position, a frequency domain position, a transmission period and a subframe offset, a type of a reference signal sequence or an orthogonal mask.

Optionally, in this embodiment, the storage medium may include, but is not limited to, a flash disk, a read-only memory (ROM), a random access memory (RAM), a mobile hard disk, a magnetic disk, an optical disk or another medium capable of storing program codes.

Optionally, for specific examples in this embodiment, reference may be made to the examples described in the above embodiments and optional implementations, and repetition will not be made in this embodiment.

Apparently, those skilled in the art should understand that the above-mentioned modules or steps of the present disclosure may be implemented by a general-purpose computing device, the modules or steps may be integrated on a single computing device or distributed on a network formed by multiple computing devices; and alternatively, the modules or steps may be implemented by program codes executable by the computing devices, so that modules or steps may be stored in a storage device and executable by the computing devices. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure are within the scope of the present disclosure.

INDUSTRIAL APPLICABILITY

The embodiments of the present disclosure enable the UE to obtain the required time-frequency resource or parameter set to properly arrange the reference signal on the time-frequency resource, thereby solving the problem in the existing art of arrangement of the reference signal when the receiving end receives the pilot signal and processes and compensates for the influence of the phase noise.

What is claimed is:

1. A wireless communication method, comprising:
   determining, by a base station, that an index of a modulation and coding scheme of downlink data is greater than or equal to five; and
   transmitting, by the base station and in response to the determining, a phase noise reference signal to a user equipment (UE),
      wherein a time domain symbol position of the phase noise reference signal is based on a system transmission bandwidth,
      wherein the phase noise reference signal is transmitted at frequency domain positions that includes one or more subcarrier positions in every M physical resource blocks (PRBs),
      wherein M is an integer, and
      wherein M is based on the system transmission bandwidth.

2. A reference signal transmission device, applied to a base station, comprising:
   a processor configured to:
   determine that an index of a modulation and coding scheme of downlink data is greater than or equal to five; and
   transmit, in response to the determined index, a phase noise reference signal to a user equipment (UE),
      wherein a time domain symbol position of the phase noise reference signal is based on a system transmission bandwidth,
      wherein the phase noise reference signal is transmitted at frequency domain positions that includes one or more subcarrier positions in every M physical resource blocks (PRBs),
      wherein M is an integer, and
      wherein M is based on the system transmission bandwidth.

3. A wireless communication method, comprising:
   determining, by a base station, that an index of a modulation and coding scheme of downlink data is greater than or equal to ten; and
   transmitting, by the base station and in response to the determining, a phase noise reference signal to a user equipment (UE),
      wherein a time domain symbol position of the phase noise reference signal is based on a system transmission bandwidth,
      wherein the phase noise reference signal is transmitted at frequency domain positions that includes one or more subcarrier positions in every M physical resource blocks (PRBs),
      wherein M is an integer, and
      wherein M is based on the system transmission bandwidth.

4. The method of claim 3, wherein the base station operates at a modulation scheme of 16 QAM, 64 QAM or 256 QAM.

5. The method of claim 3, wherein the base station operates using code division multiple access (CDMA), time division multiple access (TDMA), or frequency division multiple access (FDMA) technology.

6. A reference signal transmission device, applied to a base station, comprising:
   a processor configured to:
   determine that an index of a modulation and coding scheme of downlink data is greater than or equal to ten; and
   transmit, in response to the determined index, a phase noise reference signal to a user equipment (UE),
      wherein a time domain symbol position of the phase noise reference signal is based on a system transmission bandwidth,
      wherein the phase noise reference signal is transmitted at frequency domain positions that includes one or more subcarrier positions in every M physical resource blocks (PRBs),
      wherein M is an integer, and
      wherein M is based on the system transmission bandwidth.

7. The reference signal transmission device of claim 6, wherein the base station operates at a modulation scheme of 16 QAM, 64 QAM or 256 QAM.

8. The reference signal transmission device of claim 6, wherein the base station operates using code division multiple access (CDMA), time division multiple access (TDMA), or frequency division multiple access (FDMA) technology.

9. The method of claim 1, wherein the base station operates at a modulation scheme of 16 QAM, 64 QAM or 256 QAM.

10. The method of claim 1, wherein the base station operates using code division multiple access (CDMA), time division multiple access (TDMA), or frequency division multiple access (FDMA) technology.

11. The reference signal transmission device of claim 2, wherein the base station operates at a modulation scheme of 16 QAM, 64 QAM or 256 QAM.

12. The reference signal transmission device of claim 2, wherein the base station operates using code division multiple access (CDMA), time division multiple access (TDMA), or frequency division multiple access (FDMA) technology.

* * * * *